UNITED STATES PATENT OFFICE.

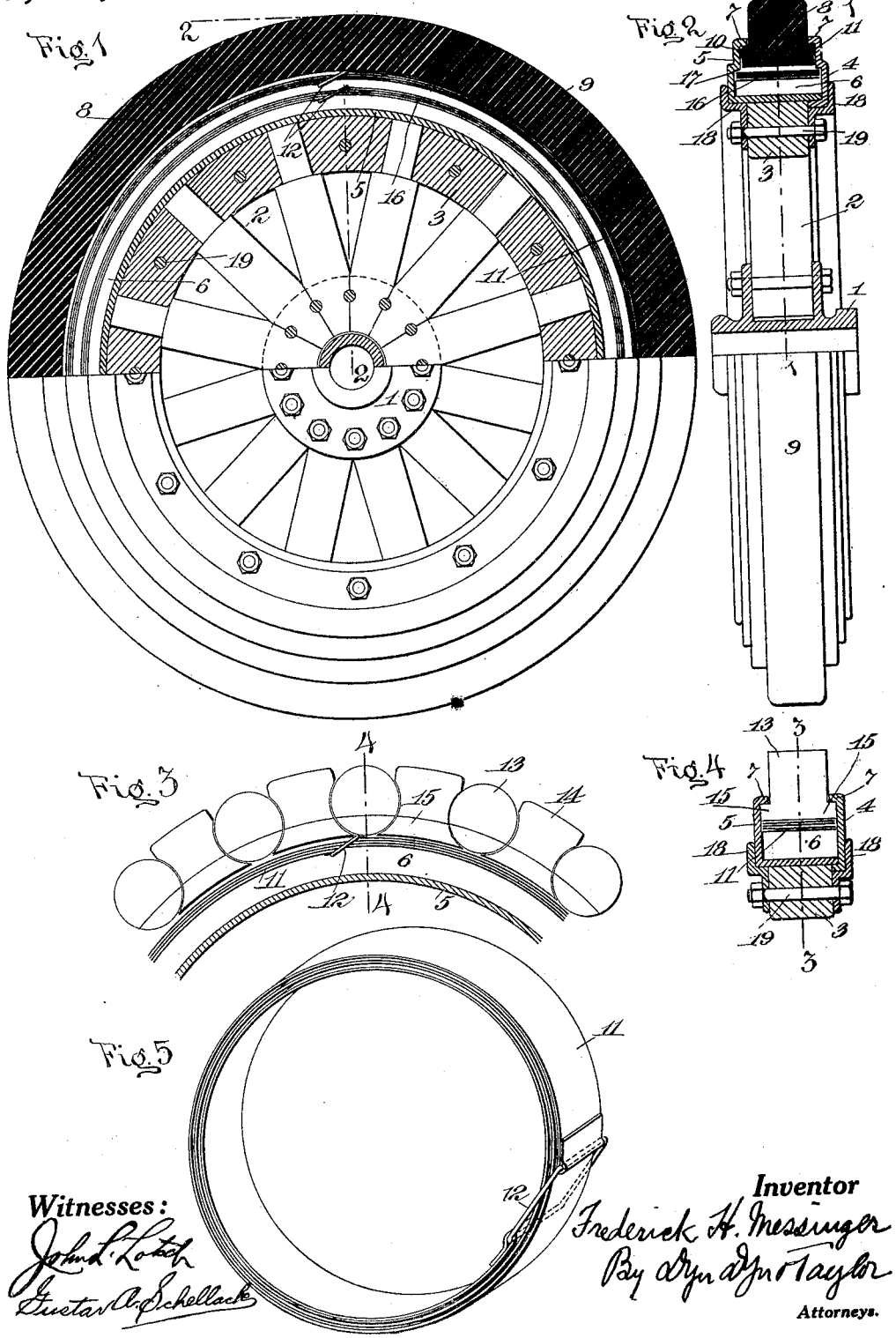

FREDERICK H. MESSINGER, OF NEW YORK, N. Y.

VEHICLE-WHEEL.

1,103,308.

Specification of Letters Patent. Patented July 14, 1914.

Application filed December 27, 1910. Serial No. 599,367.

*To all whom it may concern:*

Be it known that I, FREDERICK H. MESSINGER, a citizen of the United States, and a resident of the borough of Manhattan, city, county, and State of New York, have invented a certain new and useful Vehicle-Wheel.

The object I have in view is the production of an elastic wheel for vehicles, in which a pneumatic tire will be avoided.

Further objects are to produce a wheel which will have all of the resiliency of the pneumatic tire, without the disadvantages of the latter.

Another object is to produce a resilient wheel in which provision is made for yielding against shocks of small magnitude, with additional provision for yielding against shocks of greater magnitude.

A still further object is to produce means for adjusting the amount of resiliency of the wheel.

Further objects will more fully appear from the following specification and accompanying drawings, considered together or separately.

In the drawings, Figure 1 is a view of a wheel embodying my invention, the said view being partly in section on the line 1—1 of Fig. 2. Fig. 2 is a view partly in section at right angles to Fig. 1, the section being taken on the line 2—2 of Fig. 1. Fig. 3 is a section view in detail of a modified form of tread, taken on the line 3—3 of Fig. 4. Fig. 4 is a section on the line 4—4 of Fig. 3. Fig. 5 is a perspective view of the elastic member of the wheel.

In all of the views, like parts are designated by the same reference characters.

According to my invention the wheel comprises the ordinary hub 1, the spokes 2, the felly 3. Upon the felly is carried the annular frame 4—5. This frame provides an annular chamber 6. The frame is open on the periphery, and is provided with annular flanges 7—7. The tread 8, as shown in Figs. 1 and 2, is preferably of rubber or other elastic material, and is continuous. It has a bearing surface 9.

It also has annular flanges 10—10, which engage under the flanges 7—7 on the frame 4—5.

11 is the elastic member, which lies within the chamber 6, and engages with the tread and tends to elastically force the tread outward with the flanges 10—10 in engagement with the flanges 7—7 of the frame. The elastic member is best shown in Fig. 5. It is composed of a strip of elastic material, preferably steel, coiled upon itself and surrounding the felly. I prefer to make it in a plurality of coils, shown in Fig. 5, and in a single piece. The free ends of the strip may be supported in any way, but I prefer to connect them together by means of a bail or link 12, as shown in Fig. 5. This bail or link permits collapsing or distortion of the elastic member to accommodate inequalities in the tread.

In lieu of the continuous tread 9, shown in Figs. 1 and 2, I may make it of solid material formed in sections, like a chain. Figs. 3 and 4 illustrate such an arrangement, the tread being formed of alternately cylindrical members 13, and rectangular members 14, the rectangular members having notches within which the cylindrical members lie. Both sets of members have projecting flanges 15, (see Fig. 4) which lie under the flanges 7—7 of the frame. This tread is kept distended by engagement of the elastic member 11, in the manner already described.

For the purpose of providing a second device to provide for the taking of intense shocks or shocks greater or distortions greater than will be taken care of by the elastic member 11, I provide an additional elastic member 16 (see Figs. 1 and 2), this additional member being of smaller diameter than the member 11. This member engages under annular shoulders 17 formed in the frame 4—5 and by engagement with these annular flanges it is kept under compression. I prefer to have an annular space between the two elastic members, as shown in Figs. 1 and 2, so that the first elastic member may be distorted within reasonable limits before it comes into engagement with the second one, the second one taking up whatever shocks may be imparted to it. The member 16 is wider than the member 11, so that the inner member will engage with the wider flanges 17—17 and the outer member with the tread, which engages with the narrow flanges 7—7. If desired, some suitable provision may be made to prevent creeping or relative movements between the tread and the felly. Such devices are well known and need not be described. It is to be noted that the annular frame is made of two pieces, so that the parts may be assembled.

The frame 4—5 is secured to the felly by two annular flanged plates 18, 18, which are removably secured to the felly by bolts 19. By removing the bolts, the frame may be taken apart, and the elastic member or members removed or adjusted, also repairs, replacements or adjustments may be made to the tread.

It is to be understood that the elastic member may be made of any number of coils of elastic material. When a plurality of coils are used, they overlap, producing laminæ. It is to be understood that these laminæ should have a lubricant, if necessary, between adjoining surfaces. It is also to be understood that the hub and spokes of the wheel may be omitted, those shown being merely for the purposes of illustration. Where a solid wheel is used, it is to be understood that the part herein denominated as felly will be the part which the elastic member is coiled around.

It is obvious that various modifications may be made without departing from the spirit or scope of my invention.

The resiliency of the wheel may be adjusted to suit different conditions by removing the elastic member and substituting another of the required degree of stiffness.

In accordance with the provisions of the patent statutes I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A vehicle wheel having a felly, a tread, a flat coiled spring between said felly and said tread, and a pivoted connection between the ends of said spring, said connection permitting relative movement of the convolutions of the spring.

2. A vehicle wheel having a felly, an annular frame carried by said felly and having a chamber therein, a tread mounted in said chamber and projecting therefrom, a flat coiled spring located within said chamber and engaging said tread, and a link connecting the ends of said spring, said link permitting relative movement of the convolutions of the spring.

3. A vehicle wheel having a felly, an annular frame carried by said felly and having a chamber therein, the walls of which have annular flanges, a tread having flanges which engage the outer flanges of said chamber, a flat coiled spring located within said chamber and engaging said tread, a pivoted connection between the ends of said spring, and a second coiled flat spring located within said chamber and coöperating with the inner flanges in the walls of said chamber, a pivoted connection between the ends of the second spring, the pivoted connection of each spring permitting relative movement of the convolutions of its spring.

4. A vehicle wheel having a felly, an annular frame carried by said felly and having a chamber therein the walls of which have inner and outer annular flanges, a tread having flanges which engage the outer flanges of said chamber, a flat coiled spring located within said chamber and engaging said tread, a second flat coiled spring located within said chamber and coöperating with the inner flanges in the walls of said chamber, and links connecting the ends of each spring.

This specification signed and witnessed this 21st day of Dec., 1910.

FREDERICK H. MESSINGER.

Witnesses:
JAS. F. COLEMAN,
JOHN L. LOTSCH.

Copies of this patent may be obtained for five cents each, by addressing the "Commissioner of Patents, Washington, D. C."